United States Patent

[11] 3,579,203

[72] Inventor Michael M. Malmer, Jr.
Livonia, Mich.
[21] Appl. No. 783,252
[22] Filed Dec. 12, 1968
[45] Patented May 18, 1971
[73] Assignee Burroughs Corporation
Detroit, Mich.

[54] RECIRCULATING BUFFER MEMORY
4 Claims, 6 Drawing Figs.

[52] U.S. Cl. 340/173RC, 333/29
[51] Int. Cl. G11c 19/00, G11c 21/00
[50] Field of Search 340/173; 235/151; 333/29

[56] References Cited
UNITED STATES PATENTS

| | | | |
|---|---|---|---|
| 3,153,776 | 10/1964 | Schwartz | 340/173X |
| 3,311,891 | 3/1967 | Brady | 340/173X |
| 3,368,203 | 2/1968 | Loizides | 340/173X |
| 3,493,938 | 2/1970 | Cuccio | 340/173 |

*Primary Examiner*—Bernard Konick
*Assistant Examiner*—Stuart Hecker
*Attorneys*—Kenneth L. Miller, Wallace P. Lamb, Edwin W. Uren and Paul W. Fish

ABSTRACT: The disclosure embodies a dynamic, first-in-first-out buffer memory and includes means for selectively and sequentially recirculating and advancing the relative positions of the binary encoded data therein.

RECIRCULATING BUFFER MEMORY

SUMMARY OF THE INVENTION

The invention resides in the provision of an electronic, logical circuit for controlling the binary encoded data input to, transfer and recirculation within and without, and output from a dynamic, first-in-first-out buffer memory.

It is an object of the invention to provide an improved electronic, logical, recirculating buffer memory control circuit.

Another object of the invention is to provide an improved means for controlling the data input, recirculation and transfer within a recirculating buffer memory.

Another object of the invention is to provide an improved means for monitoring data stored in a recirculating buffer memory.

IN THE DRAWINGS

Figure 1:
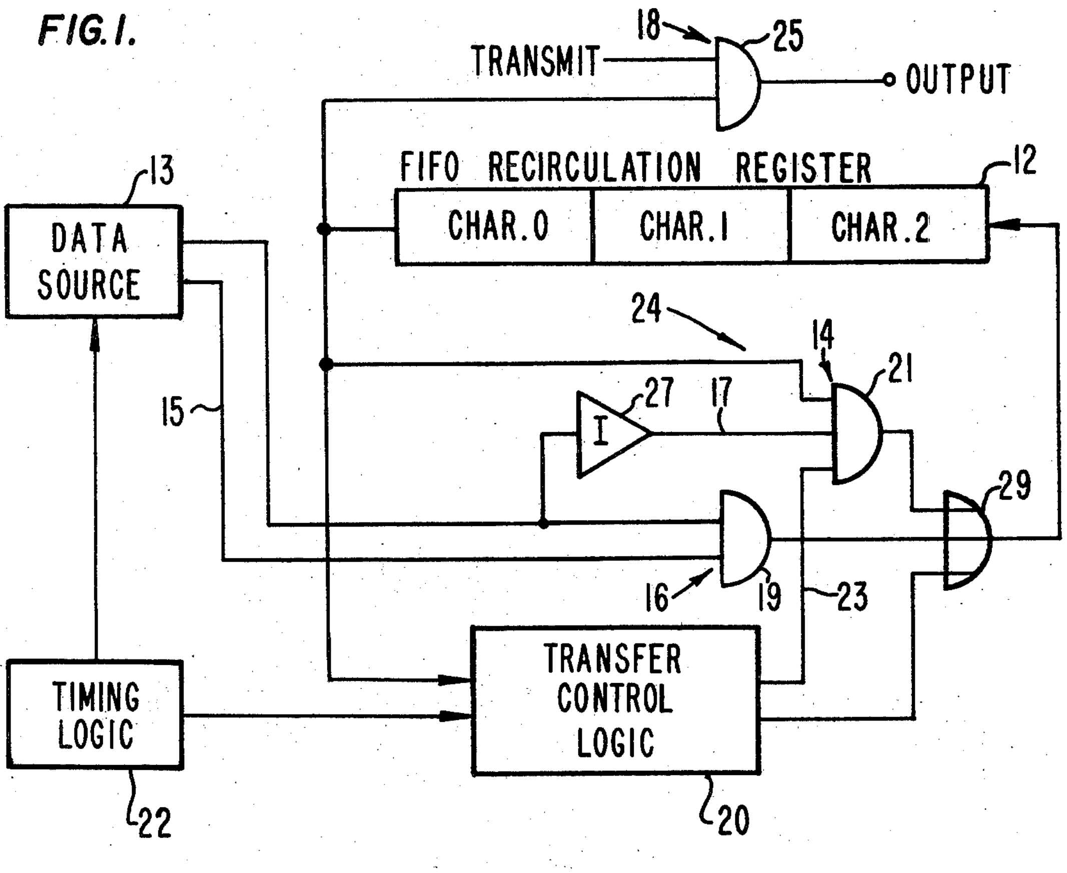
FIG. 1 is a diagram, partly in block and symbolic form, of a dynamic, first-in-first-out buffer memory in accordance with the present invention.

The logic elements depicted in the drawings are standard AND gates, OR gates, inverters and JK-type flip-flops.

Glossary and Index of Signals

BT64 (FIG. 3) A timing signal associated with the 65th of 66 bits or count times in a word.

BT65 (FIG. 3) A timing signal associated with the 66th of 66 bits or count times in a word.

CHO, 1...7 (FIG. 3) The timing signals associated with character times zero through seven respectively.

CTO, 1...7 (FIG. 3) The timing signals associated with count times zero through seven respectively.

END DUMP (FIG. 4) A signal used to reset P2FF after the binary data has been removed from character two of the register.

FNDBIT (FIG. 4) A timing signal used to synchronize the delayed transfer of binary data from one character to the next.

LOAD (FIG. 4) A signal used to indicate that binary data is being stored in the register.

LOR (FIG. 4) The binary data signal read from the register.

$\theta 1$ and $\theta 2$ (FIG. 3) The timing signals used to advance binary data within the register.

P0F, P1F and P2F (FIG. 4) The signals used to indicate the presence of binary data in characters zero, one and two respectively.

T (FIG. 3) The basic timing clock signal.

TRANSMIT (FIG. 1) A signal used to enable the buffer register output.

−V (FIG. 5) A negative voltage applied to the register stages.

WTO, 1...7 (FIG. 3) The timing signals associated with word times zero through seven respectively.

XFR (FIG. 4) The output signal of the transfer flip-flop used to store a binary one in the register.

DETAILED DESCRIPTION

With reference to FIG. 1, the buffer memory includes a cyclic delay means or register 12, a recirculation path means 14, an input path means 16, an output path means 18, a transfer path means or control logic 20, timing means or logic 22, and control means 24. The recirculation path means 14 and transfer path means 20 operate selectively through the control means 24 to form an operational loop with the register 12. The input path means 16 operates through the control means 24 to access the register 12. The output path means 18 provides a data exit from the register. The timing means 22 synchronizes the operation of the buffer memory.

A three-character buffer 12 is shown in FIG. 1. A typical application of the invention, however, might use a memory register having a greater number of characters, the first three of which might be used as a buffer register. The basic timing relationships depicted in FIG. 2 are based on an application using a total of eight characters per memory word.

Figure 2:
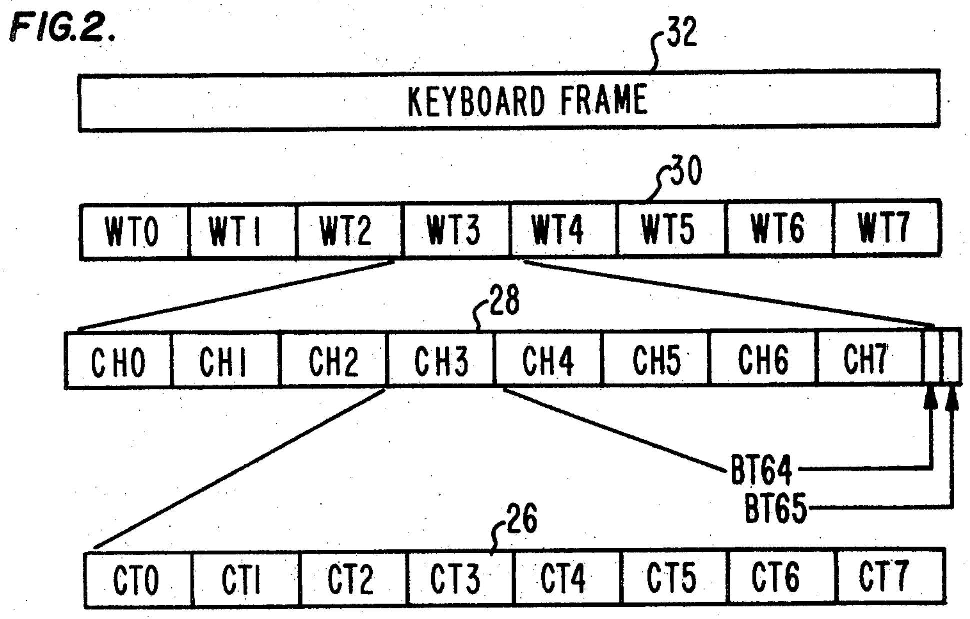
FIG. 2 is a representation of the relationship between the basic timing increments used in the buffer memory.

With reference to FIG. 2, the basic timing increment is a count or bit time 26. Eight bit times 26 correspond in time to one character time 28. Eight character times 28 plus two extra bit times 26, making a total of 66 bit times 26, correspond in time to one word time 30. Eight word times 30 correspond to one keyboard frame 32.

Figure 3:
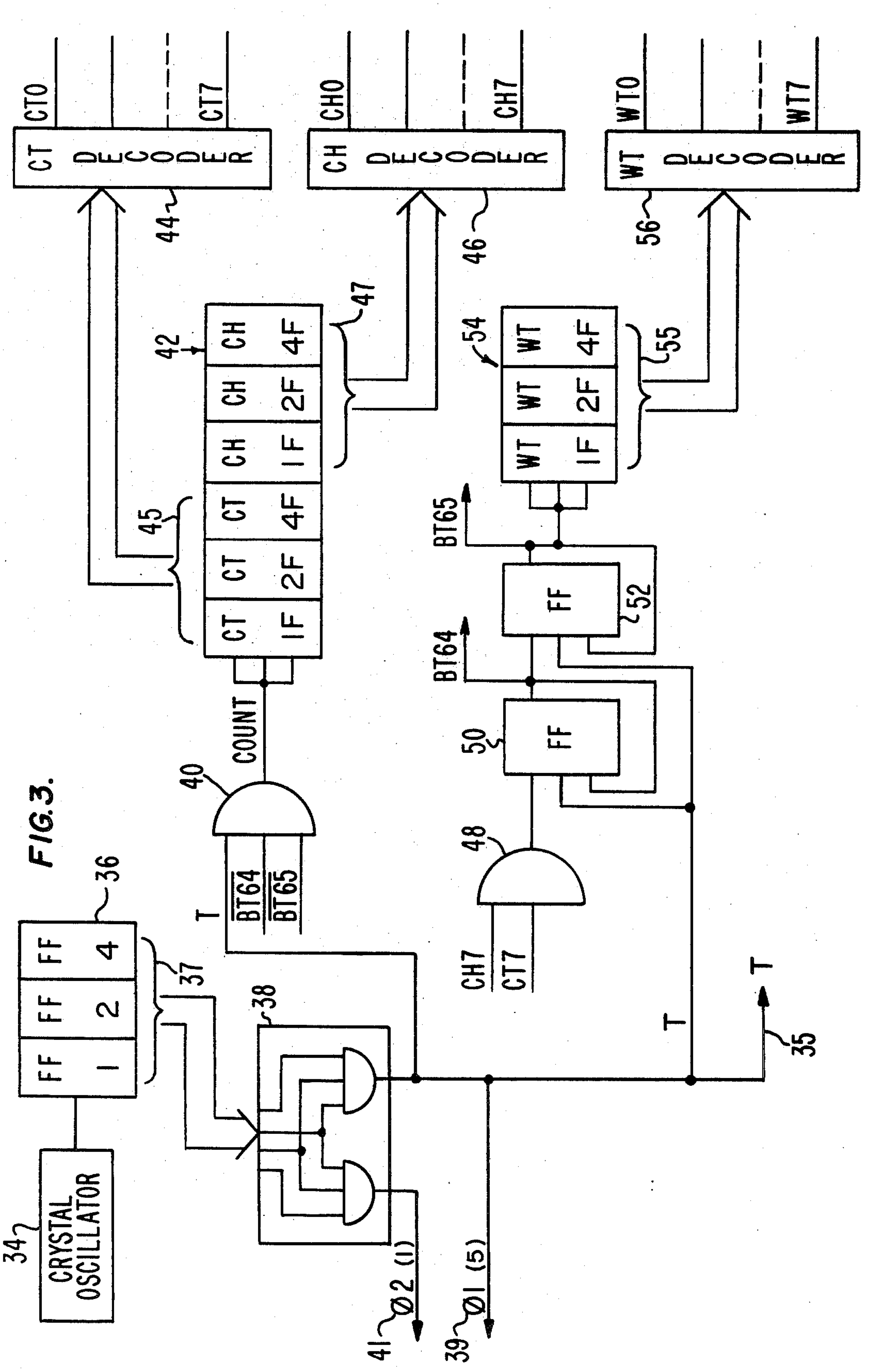
FIG. 3 is a diagram, partly in block and symbolic form, of the timing logic used in the buffer memory.

With reference to FIG. 3, the timing logic 22 (FIG. 1) includes a stable oscillator 34, a modulus eight oscillator counter 36, an oscillator counter decoder 38, a count logic AND gate 40, a modulus 64 count time and character time counter 42, a count time decoder 44, a character time decoder 46, a word time logic AND gate 48, a bit time 64 flip-flop 50, a bit time 65 flip-flop 52, a modulus eight word time counter 54, and a word time decoder 56. Each stage of the counters is a JK flip-flop connected in the well-known manner for ripple counters. Each stage is actuated by the resetting of the previous stage. The decoders are standard AND gates connected in the well-known manner to reflect the states of the ripple counter flip-flop outputs.

The oscillator 34 output is connected to the input of the oscillator counter 36, the outputs 37 of which are decoded by the counter decoder 38. The two outputs 39 and 41 of the counter decoder 38 provide timing for the register 12 (FIG. 1), and one of the outputs 39 provides a basic machine timing of T pulse 35.

The output of the count logic AND gate 40 is connected to the input of the count time and character time counter 42. The outputs 45 of the first three stages of the modulus 64 counter 42 are connected to the inputs of the count time decoder 44, and the outputs 47 of the last three stages are connected to the inputs of the character time decoder 46.

The output of the word time logic AND gate 48 is connected to the input of the bit time 64 flip-flop 50 the output of which is in turn connected to the input of the bit time 65 flip-flop 52. The output of the bit time 65 flip-flop 52 is connected to the input of the word time counter 54, the outputs of which are connected to the inputs of the word time decoder 56.

Figure 4:
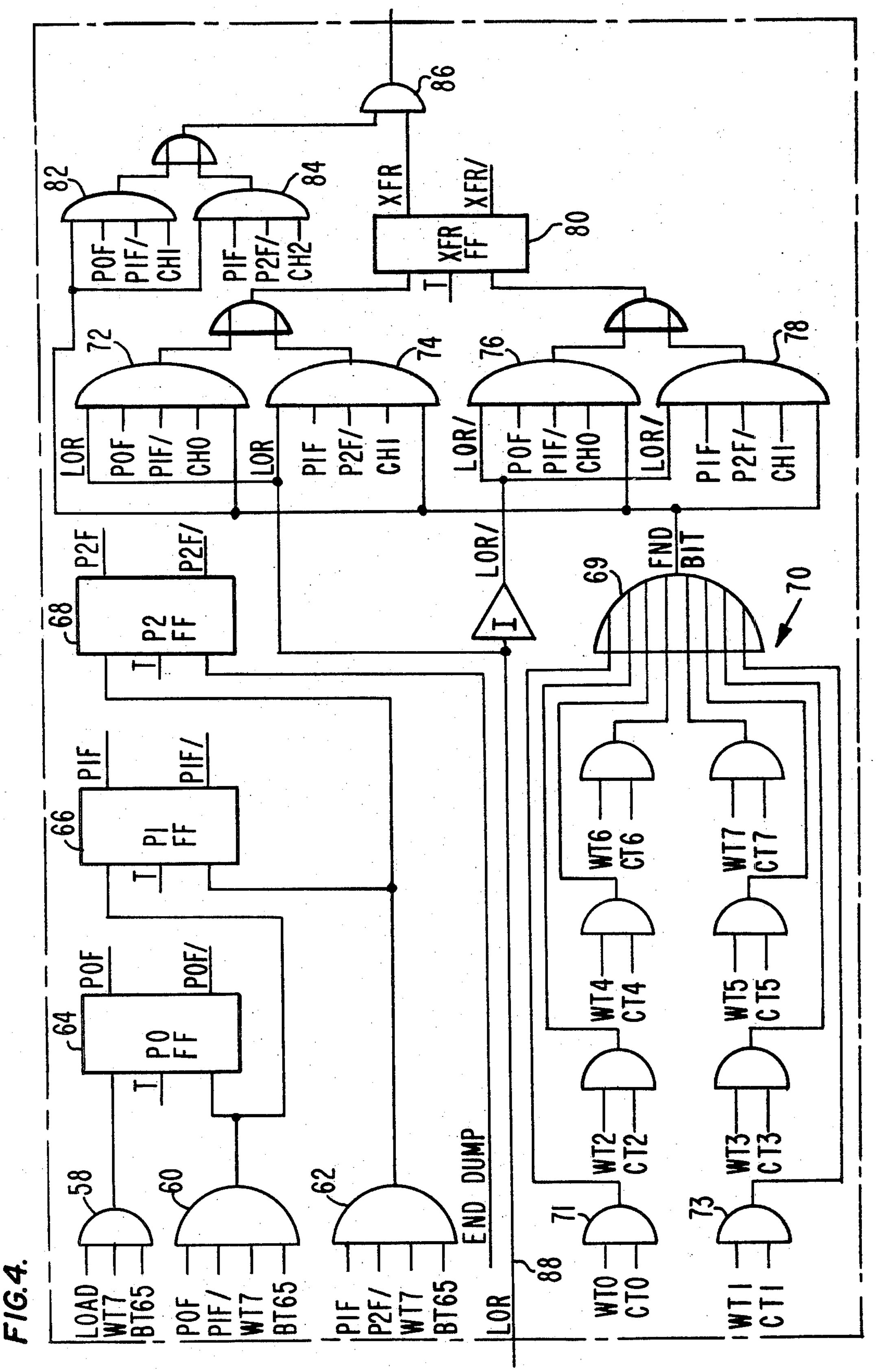
FIG. 4 is a diagram of the transfer control logic used in the buffer memory.

The outputs of the count time decoder 44, the character time decoder 46 and the word time decoder 56 are connected to the inputs of the bit location decoder 70 (FIG. 4).

With reference to FIG. 4, the transfer control logic 20 (FIG. 1) includes a character zero information presence AND gate 58, a character one information presence AND gate 60, a character two information presence AND gate 62, a character zero information presence flip-flop 64, a character one information presence flip-flop 66, a character two information presence flip-flop 68, a bit location decoder 70 comprising eight AND gates, the outputs of which are fed to an OR gate, a transfer binary one from character zero to one AND gate 72, a transfer binary one from character one to two AND gate 74, a transfer binary zero from character zero to one AND gate 76, a transfer binary zero from character one to two AND gate 78, a temporary storage or transfer flip-flop 80, a transfer output to character one AND gate 82, a transfer output to character two AND gate 84, and a transfer output AND gate 86.

The character zero, one and two information AND gates, 58, 60 and 62 respectively, are connected to the character zero, one and two information presence flip-flops, 64, 66 and 68 respectively. The outputs of the flip-flops 64, 66 and 68 and the output of the bit location decoder 70 are connected to the transfer AND gates 72, 74, 76, 78, 82 and 84. The signal 88 read from the register 12 (FIG. 1) is also connected to the transfer AND gates 72, 74, 76 and 78. The outputs of the transfer AND gates 72, 74, 76 and 78 are connected to the transfer flip-flop 80. The outputs of the transfer AND gates 82 and 84 and the output of the transfer flip-flop 80 are connected to the transfer output AND gate 86. The output of the transfer output AND gate 86 is connected to the register 12 (FIG. 1).

Figure 5:
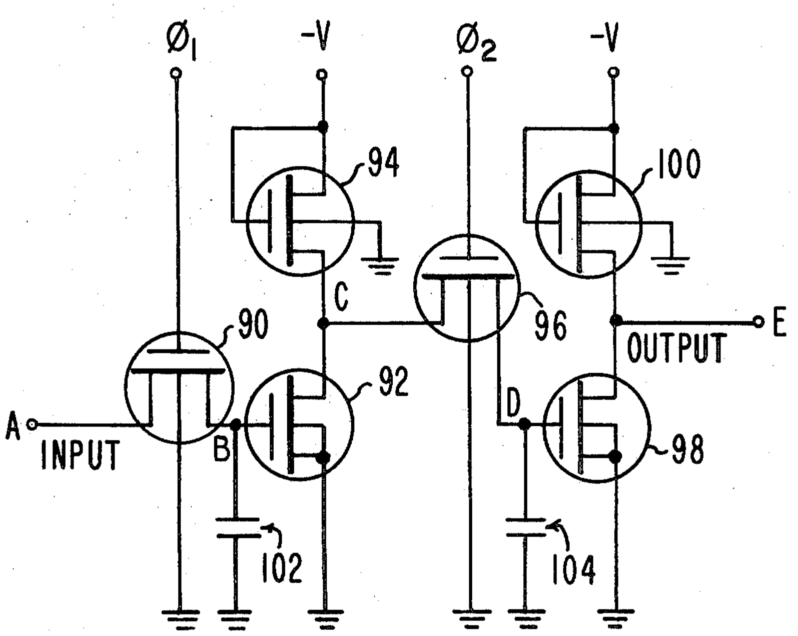
FIG. 5 is a schematic diagram of one stage of the dynamic, first-in-first-out register.

With reference to FIG. 5, one stage of the dynamic, first-in-first-out register 12 (FIG. 1) includes six metal oxide semiconductors or insulated gate field-effect transistors 90, 92, 94, 96, 98 and 100. The stage is divided into an input and an output section of three transistors each. The input section includes an input transfer gate transistor 90, an input inverter transistor 92 and an input load transistor 94. The output section includes an output transfer gate transistor 96, an output inverter transistor 98 and an output load transistor 100.

The input capacitor 102 and output capacitor 104 are not discrete capacitors. They represent the parasitic capacitance of the input transfer gate transistor 90 and input inverter transistor 92 and the output transfer gate transistor 96 and inverter transistor 98 respectively and also that of the associated circuitry.

The output of the previous register stage is connected to the source of the input transfer gate transistor 90 and the phase one timing signal 39 (FIG. 3) is applied to the gate. The drain of the input transfer gate transistor 90 is connected to the gate of the input inverter transistor 92. The source of the input inverter transistor 92 is connected to ground and the drain is connected to the source of the input load transistor 94. The gate and drain of the input load transistor 94 are connected to a negative potential.

The drain of the input inverter transistor 92 is also connected to the source of the output transfer gate transistor 96, and the phase two timing signal 41 (FIG. 3) is applied to the gate. The drain of the output transfer gate transistor 96 is connected to the gate of the output inverter transistor 98. The source of the output inverter transistor 98 is connected to ground and the drain is connected to the source of the output load transistor 100. The gate and drain of the output load transistor 100 are connected to a negative potential. The drain of the output inverter transistor 98 is also connected to the input of the next register stage.

Figure 6:
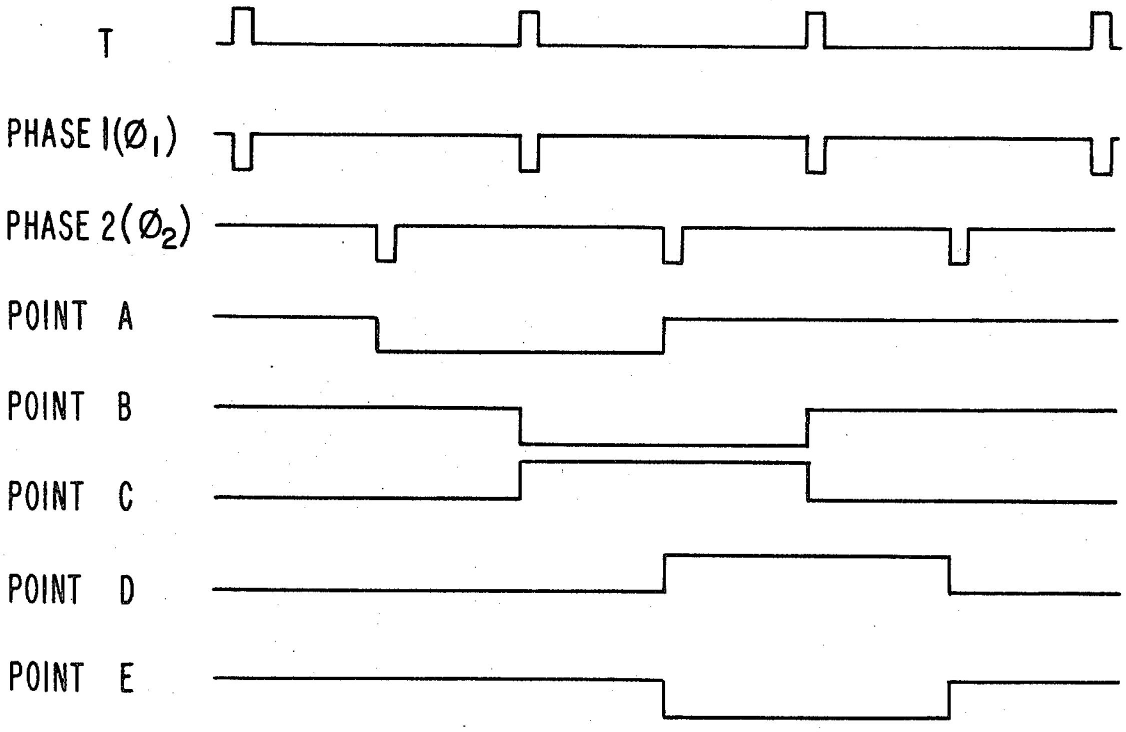
FIG. 6 is a graphic diagram of various waveforms of pulses in a register stage.

With reference to FIG. 6, the graphic diagram of the various waveforms of pulses in the register stage schematically depicted in FIG. 5 includes the basic timing clock signal T, the binary data advancing timing signals $\theta 1$ and $\theta 2$, a typical input signal A, intrastage signals B, C, and D, and the resulting output signal E.

OPERATION

With reference to FIG. 1, assuming that the register 12 contains no binary encoded data, each register stage would contain a binary zero. These binary zeros would normally be read out of the register 12, recirculated through the recirculation path means 14 and replaced in their original relative positions within the register 12.

Data could be placed into the register 12 from a binary data source 13 such as a binary-output keyboard, examples of which are well known in the art, via the input path means 16. The data source 13 would provide binary data signals on an input data line 15 and an input timing signal which would be inverted by the inverter 27 to form a register recirculation inhibit signal on an input data recirculation inhibit line 17. The inhibit signal would disable the register recirculation control AND gate 21, preventing the recirculation of data already within the register 12 while the data source 13 enters data. The combination of the signals on the data input lines 15 and 17 would enable the data input AND gate 19; and the binary data would be placed in bit zero, character zero of the register 12, by way of the OR gate 29.

The nature of the buffer register is such that data placed into character zero of the register 12 would be shifted or transferred to character two as soon as character two contains no binary data.

This particular embodiment of the invention provides that data be transferred sequentially, one bit at a time, from character zero to character one and then to character two of the register 12; but it should be understood that provision could be made by anyone skilled in the art to transfer data in a number of other ways, such as from character zero directly to character two.

The binary data placed into bit zero of character zero would be read out and stored by the transfer path means 20 at word time zero, count time zero for one character time and then replaced by way of the OR gate 29, this time in bit zero of character one. The binary data placed into bit one of character zero would be read out and stored by the transfer path means 20 at word time one, count time one for one character time and then replaced, this time in bit one of character one. This operation would continue until all of the binary data in character zero was transferred to character one. A similar operation would then transfer the data from character one into character two. During the transfer operation, a register recirculation inhibit signal would be provided via the transfer data recirculation inhibit line 23 to disable the register recirculation control AND gate 21.

When information is to be withdrawn from the register, a TRANSMIT signal would be applied to the output path AND gate 25.

With reference to FIG. 3, the stable crystal oscillator 34 output would be fed to the modulus eight oscillator counter 36. The outputs 37 of these counter flip-flops would be fed to the oscillator counter decoder 38, where every eighth oscillator pulse would be decoded to become both a T-pulse 35 and a Phase One pulse 39. The Phase Two pulse 41 would also occur every eight oscillator pulses but would be decoded midway between the Phase One pulses 39 such that the Phase One pulses 39 and Phase Two pulses 41 would alternately occur at equally spaced intervals.

The T-pulse 35 would enable the count logic AND gate 40 except when BT64 or BT65 are true, i.e., for 64 out of every 66 bit times. The output of the count logic AND gate 40 would step the modulus 64 count time and character time counter 42. The outputs 45 of the first three flip-flops of the counter 42 would be fed to the count time decoder 44, the outputs of which would be the count time signals, CTO through CT7. The outputs 47 of the last three flip-flops of the counter 42 would be fed to the character time decoder 46, the outputs of which would be the character time signals, CH0 through CH7.

The first T-pulse 35 after CT7 and CH7 come true would enable the word time logic AND gate 48, the output of which would set the bit time 64 flip-flop 50, which would provide the timing signal BT64. The next T-pulse 35 would reset the bit time 64 flip-flop and set the bit time 65 flip-flop 52, which would provide the timing signal BT65. The BT65 timing signal indicates that 66 bit times or one word time has elapsed. The output of the bit time 65 flip-flop 52 would be fed to the modulus 8 word time counter 54. The outputs 55 of the word time counter 54 would be fed to the word time decoder 56, the outputs of which would be the word time signals, WT0 through WT7.

With reference to FIG. 4, when character zero of the register 12 (FIG. 1) has been completely loaded, WT7 and BT65 would be true and would enable the character zero data presence AND gate 58, the output of which would set the character zero data presence flip-flop 64. The set output of this flip-flop 64 is the signal P0F, which indicates the presence of data in character zero of the register 12 (FIG. 1).

After the binary data placed in character zero have been transferred into character one, WT7 and BT65 would again be true and would enable the character one data presence AND gate 60, the output of which would set the character one data presence flip-flop 66 and reset the character zero data presence flip-flop 64. The set output of flip-flop 66 is the signal P1F, which indicates the presence of data in character one of the register 12 (FIG. 1).

After the binary data transferred into character one have been transferred into character two, WT7 and BT65 would again be true and would enable the character two data presence AND gate 62, the output of which would set the character two data presence flip-flop 68 and reset the character one data presence flip-flop 66. The set output of flip-flop 68 is the signal P2F, which indicates the presence of data in character two of the register 12 (FIG. 1).

The signal END DUMP is shown merely as a representative method of resetting the character two data presence flip-flop 68.

As previously stated, when character zero of the register 12 (FIG. 1) has been completely loaded, P0F would be true. If there is no data present in character one, P1F/ would be true. When WT0 and CT0 are true, the first bit location decoder AND gate 71 would be enabled. The output of the first AND gate 71 would be fed to the bit location decoder OR gate 69, the output of which is the signal FNDBIT. When FNDBIT and CH0 are true, indicating that the first bit of binary data in the first character is being read during the first word time, the data read, if a binary one, would enable the transfer binary one from character zero to one AND gate 72 and set the transfer flip-flop 80, making the XFR signal true. If the data read is a binary zero, the transfer binary zero from character zero to one AND gate 76 would be enabled, resetting the transfer flip-flop 80.

When next CH1 and FNDBIT are true, indicating that the first bit position of character one is accessible, the transfer output to character one AND gate 82 would be enabled. If a binary one is stored in the transfer flip-flop 80, i.e., XFR is true, the transfer output AND gate 86 would be enabled and a binary one would be written into the first bit position of character one of the register 12 (FIG. 1). If a binary zero is stored in the transfer flip-flop 80, i.e., XFR is not true, the transfer output AND gate 86 would not be enabled; and a binary zero would be written into the first bit position of character one.

The next time WT1 and CT1 are true, the second bit location decoder AND gate 73 would be enabled. The output of the second AND gate 73 would be fed to the bit location decoder OR gate 69, the output of which is the signal FNDBIT. When FNDBIT and CH0 are true, indicating that the second bit of binary data in the first character is being read during the second word time, the data read would be transferred, in a manner similar to that just described for transferring the first bit of binary data, to the second bit position of character one of the register 12 (FIG. 1). Each of the eight bits of binary data in character zero would be thus transferred in eight word times to the eight corresponding bit positions in character one.

When all of the binary data from character zero have been transferred to character one, P1F would be true. If there is no data present in character two, P2F/ would be true. When WT0 and CT0 (FNDBIT) and CH1 are also true, indicating that the first bit of binary data in the second character is being read during the first word time, the data read, if a binary one, would enable the transfer binary one from character one to two AND gate 74 and set the transfer flip-flop 80, making the XFR signal true. If the data read is a binary zero, the transfer binary zero from character one to two AND gate 78 would be enabled, resetting the transfer flip-flop 80.

When next CH2 and FNDBIT are true, indicating that the first bit position of character two is accessible, the transfer output to character two AND gate 84 would be enabled. If a binary one is stored in the transfer flip-flop 80, i.e., XFR is true, the transfer output AND gate 86 would be enabled and a binary one would be written into the first bit position of character two of the register 12 (FIG. 1). If a binary zero is stored in the transfer flip-flop 80, i.e., XFR is not true, the transfer output AND gate 86 would not be enabled; and a binary zero would be written into the first bit position of character two.

When next WT1 and CT1 (FNDBIT) and CH1 are true, indicating that the second bit of binary data in the second character is being read during the second word time, the data read would be transferred, in a manner similar to that just described for transferring the first bit of binary data, to the second bit position of character two of the register 12 (FIG. 1). Each of the eight bits of binary data in character one would be thus transferred in eight word times to the eight corresponding bit positions in character two.

With reference to FIGS. 5 and 6, a binary one being circulated through the one stage of the register 12 (FIG. 1) shown would be represented by a negative pulse applied to point A. While the negative potential of point A is applied to the source of the input transfer gate transistor 90, a Phase One pulse would be applied to the gate, driving the transistor 90 into conduction and gating the negative potential at point A to point B, charging the stage's input capacitance, represented by the capacitor 102, negatively and driving the input inverter transistor 92 into conduction. Point C, which has been held at a negative potential by −V through the input load transistor 94, would approach ground potential. When the Phase One pulse returns to ground potential, the input transfer gate transistor 90 would be cut off; but the input inverter transistor 92 would remain in conduction under the influence of the negative charge of the input capacitance 102.

At the beginning of the Phase Two pulse, the output transfer gate transistor 96 would be driven into conduction, gating the near ground potential of point C to point D, and turning off the output inverter transistor 98. Point E, which has been held at a near ground potential by the output inverter transistor 98, would go negative under the influence of −V through the output load transistor 100. When the Phase Two pulse returns to ground potential, the output transfer gate transistor 96 would be cut off. The output inverter transistor 98 would remain off. The binary one data bit, represented by the waveform appearing at point A, would thus have been gated into the stage by the Phase One pulse and gated to the output, represented by point E, by the Phase Two pulse.

I claim:

1. A dynamic buffer memory comprising:

delay means for storing data, said delay means being disposed between an input terminal and an output terminal and being divided into a plurality of character storage sections with each said character storage section being denominated in an ordered numbering system from a first input stage to a last output stage, recirculation means having one or more logical gating elements for selectively coupling said output terminal to said input terminal with no effective time delay, input means having one or more logical gating elements for selectively coupling a source of encoded data to said input terminal, output means having one or more logical gating elements for selectively coupling the output terminal of said delay means to an output of the buffer memory, monitor means selectively coupled to said delay means for continuously determining the data content of each of said character storage sections without removing said data from said character storage sections, transfer means coupled between said output terminal and said input terminal of said delay means and including a temporary storage for storing one bit of encoded data read from said output terminal of said delay means, said transfer means being operable to shift data stored in a lower order character storage section of said delay means to a higher order character storage section when said monitor means detects no data stored in such higher order character storage section, and control means for synchronizing the operations of and selectively enabling said data input, recirculation and transfer means.

2. A dynamic buffer memory as defined by claim 1 wherein said control means has timing means including an oscillator, the output of which is logically gated to define subdivisions of said delay means into count, character and word times respectively.